United States Patent [19]

Djelouah

[11] Patent Number: 4,498,302

[45] Date of Patent: Feb. 12, 1985

[54] THERMOMECHANICAL-CONVERSION ENGINE, ESPECIALLY AN ENGINE WORKING WITH A LOW-BOILING-POINT FLUID

[75] Inventor: Salah Djelouah, Loiret, France

[73] Assignee: Sorelec, Loiret, France

[21] Appl. No.: 442,382

[22] Filed: Nov. 17, 1982

[30] Foreign Application Priority Data

Nov. 19, 1981 [FR] France .................. 81 21709
Jan. 14, 1982 [FR] France .................. 82 00535

[51] Int. Cl.³ ............................. F01K 25/10
[52] U.S. Cl. .......................... 60/671; 60/516
[58] Field of Search ............ 60/693, 671, 651, 516, 60/670

[56] References Cited

U.S. PATENT DOCUMENTS 3,750,393  8/1973  Minto et al. ............ 60/671 X

FOREIGN PATENT DOCUMENTS

1285486  8/1972  United Kingdom .
1481580  8/1977  United Kingdom .
1535154  12/1978  United Kingdom .
2036186  6/1980  United Kingdom .
2080431  2/1982  United Kingdom .

Primary Examiner—Allen M. Ostrager
Attorney, Agent, or Firm—Seidel, Gonda & Goldhammer

[57] ABSTRACT

A thermomechanical-conversion engine, especially an engine working with a low-boiling-point fluid, which is composed of a circuit for the circulation of a fluid having a relatively low boiling point and including a cylinder provided with a position subdividing the cylinder into two chambers connected by a changeover device to an evaporator and to a condenser, the one constituting the hot source, the other the cold source (and vice versa), the changeover device being operated in order to connect the chambers of the cylinder alternately to the source of vapor and to the condenser.

5 Claims, 7 Drawing Figures

FIG_1

FIG_2

FIG_3

FIG_4

THERMOMECHANICAL-CONVERSION ENGINE, ESPECIALLY AN ENGINE WORKING WITH A LOW-BOILING-POINT FLUID

The invention relates to a thermomechanical-conversion engine, especially an engine working with a low-boiling-point fluid and intended for employing a source of heat such as a solar collector, in particular for large countries or countries having poorly developed electrical networks.

The aim of the present invention is to create a thermomechanical-conversion engine capable of operating at relatively low temperatures at which solar collectors operate, without necessitating any complicated circuit for concentrating this thermal energy and reaching high temperatures.

The invention will be described in detail by means of the attached drawings in which.

Figure 1:
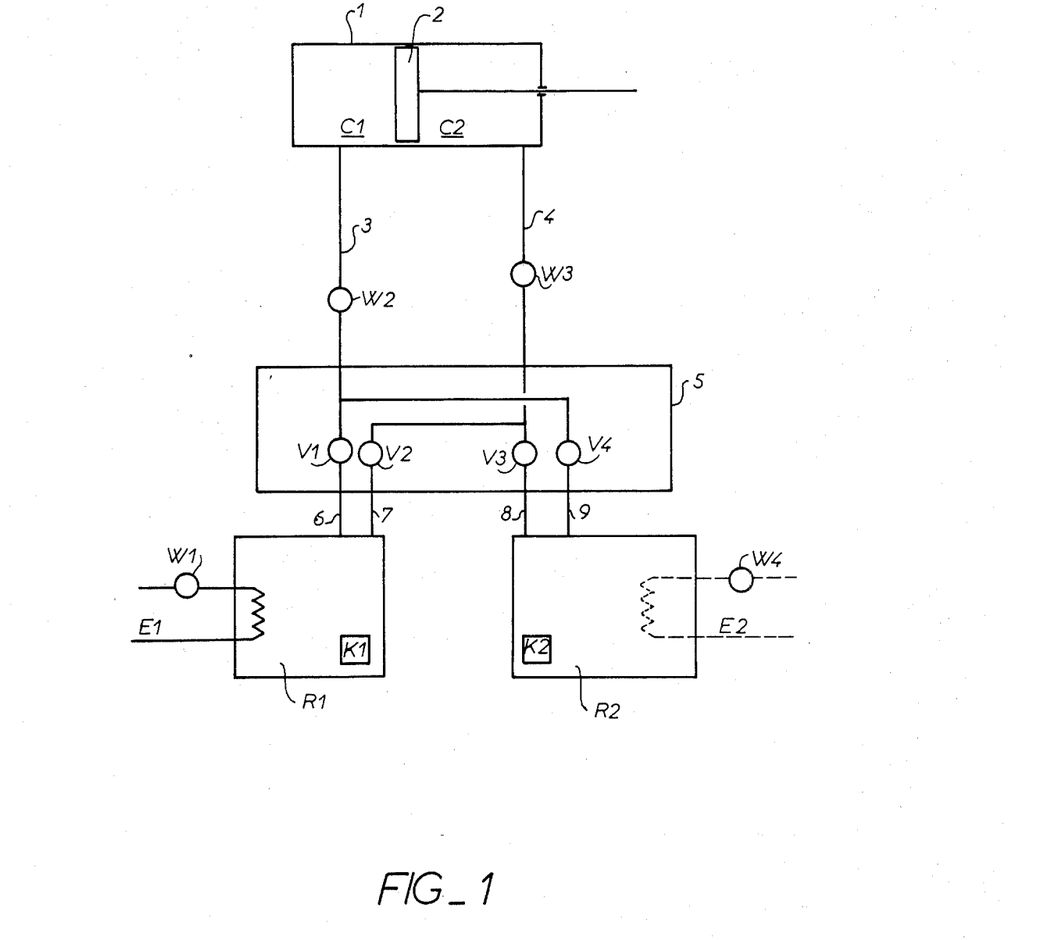
FIG. 1 is a general schematic diagram of an engine in accordance with the invention.

In accordance with FIG. 1 the thermomechanical engine is composed of a cylinder 1 containing a piston 2 which defines two chambers $C_1$ $C_2$ on opposite sides of the piston 2. The cylinder is connected by the ducts 3, 4 to a changeover device 5 which in turn is connected by the ducts 6, 7, 8, 9 to two reservoirs $R_1$, $R_2$ each including a heatexchanger $E_1$, $E_2$.

The changeover device 5 includes valves $V_1$, $V_2$, $V_3$, $V_4$ enabling the following connections to be achieved alternately, according as to whether the valves $V_1$, $V_3$–$V_2$, $V_4$ are open or closed:

When the valves $V_1$, $V_3$ are open, the valves $V_2$, $V_4$ are closed and the reservoir $R_1$ is connected by the ducts 6, 3 to the chamber $C_1$ and the reservoir $R_2$ is connected by the ducts 8, 4 to the chamber $C_2$.

When the valves $V_1$, $V_3$ are closed, the valves $V_2$, $V_4$ are open, the reservoir $R_1$ is connected to the chamber $C_2$ through the ducts 7, 4 and the reservoir $R_2$ is connected to the chamber $C_1$ through the ducts 8, 3.

The changeover device 5 may be produced either by a group of electromagnetic or pneumatic valves $V_1$, $V_2$, $V_3$, $V_4$ operated by all-or-nothing signals or by a slide capable of occupying two positions, which is operated by an electromagnet or else a cock pivoting between two positions. The reservoirs $R_1$, $R_2$ operate interchangeably as a hot source supplying the vapour and as a cold source condensing the vapour.

Initially it is assumed that the reservoir $R_1$ contains the mass of liquid to be evaporated. The reservoir $R_1$ is heated either by the sun or by some other source. This heat evaporates the liquid from the reservoir $R_1$ and the vapour under pressure feeds alternately the chambers $C_1$, $C_2$ of the cylinder 1 depending upon the state of the changeover device 5.

During the course of each cycle the vapour is condensed in the reservoir $R_2$ (condenser), the heat exchanger $E_2$ then forming part of a cooling circuit which may be replaced by direct cooling by, for example, running water.

Following the cycles progressively, the liquid is evaporated in the reservoir $R_1$ and is condensed into the reservoir $R_2$. When the lower limit of liquid is reached in the reservoir $R_1$, the operation of the reservoirs $R_1$, $R_2$ is changed over by changeover of the heat-bearing fluids in the circuits and of the valves $V_1$, $V_2$, $V_3$, $V_4$.

When the reservoir $R_2$ operates as the evaporator, the valves $V_3$, $V_1$ are first of all opened in order to enable entry of the vapour into the chamber $C_2$ and the discharge of the vapour from the chamber $C_1$ into the condenser $R_1$. In this position the valves $V_4$, $V_2$ are closed.

During this phase the valves $V_4$, $V_2$ are opened and the valves $V_3$, $V_1$ are closed. The vapour feeds the chamber $C_1$ and the vapour from the chamber $C_2$ is condensed in the reservoir $R_1$.

The reversal of the operation of the reservoirs $R_1$, $R_2$ is ensured by a circuit of water-level pick-up sets $K_1$, $K_2$ in each of the reservoirs $R_1$, $R_2$.

The speed of operation of the engine depends upon the application of heat by the exchanger $E_1$ (or $E_2$) or upon the flow of vapour feeding the chambers $C_1$ and $C_2$. The operation is governed by the throttle valves $W_1$, $W_2$, $W_3$, $W_4$.

Figure 2:
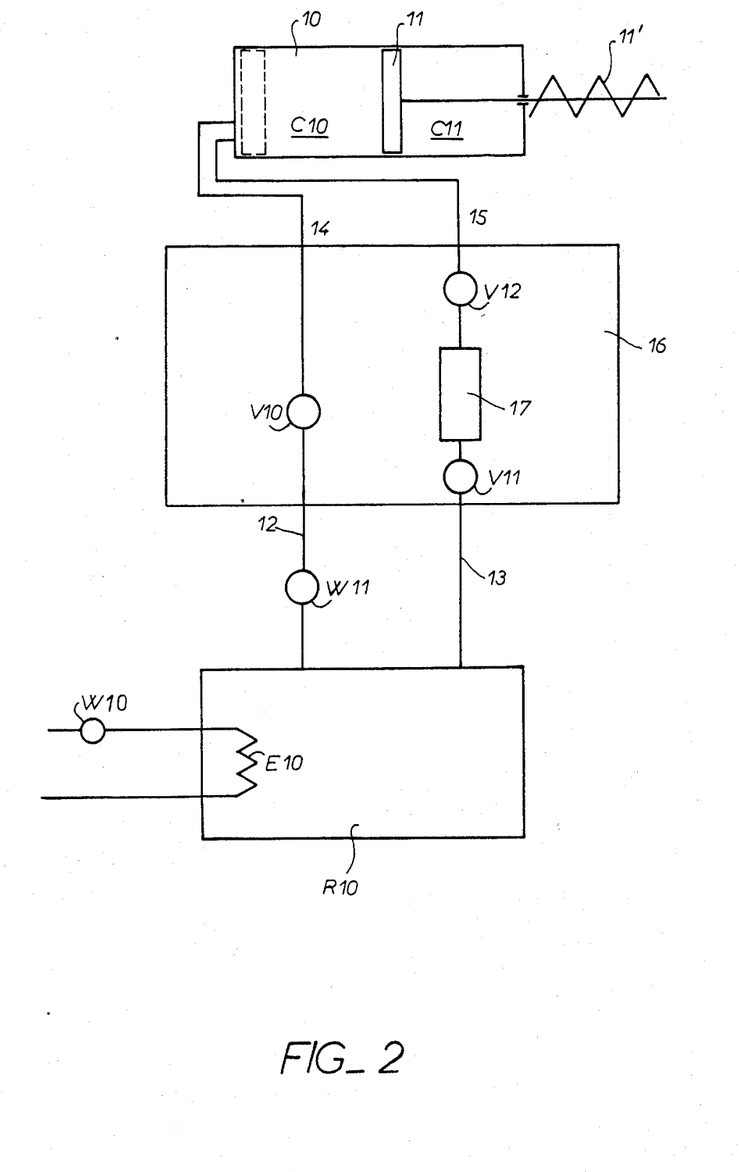
FIG. 2 is a diagram of a first variant upon the invention.

FIG. 2 shows a variant upon the engine, applied to the simple case of a cylinder 10 provided with a piston 11 defining two chambers $C_{10}$, $C_{11}$, the piston being returned into the left-hand end position (the position in dotted line) by a return spring 11'.

The chamber $C_{10}$ is the only one to receive the evaporated fluid. That is, the reservoir of fluid $R_{10}$, provided with the heatexchanger $E_{10}$ is connected by the ducts 12, 13 to a changeover device 16. Ducts 14, 15 connect the changeover device 16 to the chamber $C_{10}$. The device 16 includes a valve $V_{10}$ connecting the ducts 12, 14 and two valves $V_{11}$, $V_{12}$ and a lock-chamber 17 connecting the ducts 13 and 15. The reservoir $R_{10}$ operates as an evaporator likewise receiving the condensate.

The exchanger $E_{10}$ supplies the heat to the liquid in the reservoir $R_{10}$. At the start of the cycle of operation, the valve $V_{10}$ is open in order to enable the passing of the vapour through the duct 14 into the chamber $C_{10}$ of the cylinder 10 and pushing of the piston 11 back towards the right. Then the valve $V_{10}$ is closed and the valve $V_{12}$ is opened, the valve $V_{11}$ being closed.

The vapour passes into the lock-chamber 17 and is condensed in it; the piston 11 is returned into its left-hand end position by the atmospheric pressure assisted by the spring 11'.

When the piston 11 is over to the left, the valve $V_{12}$ is closed and the valve $V_{10}$ is opened. At the same time the valve $V_{11}$ may be opened at this instant in order to let the condensate escape from the lock-chamber 17 towards the reservoir $R_{10}$.

Figure 3:
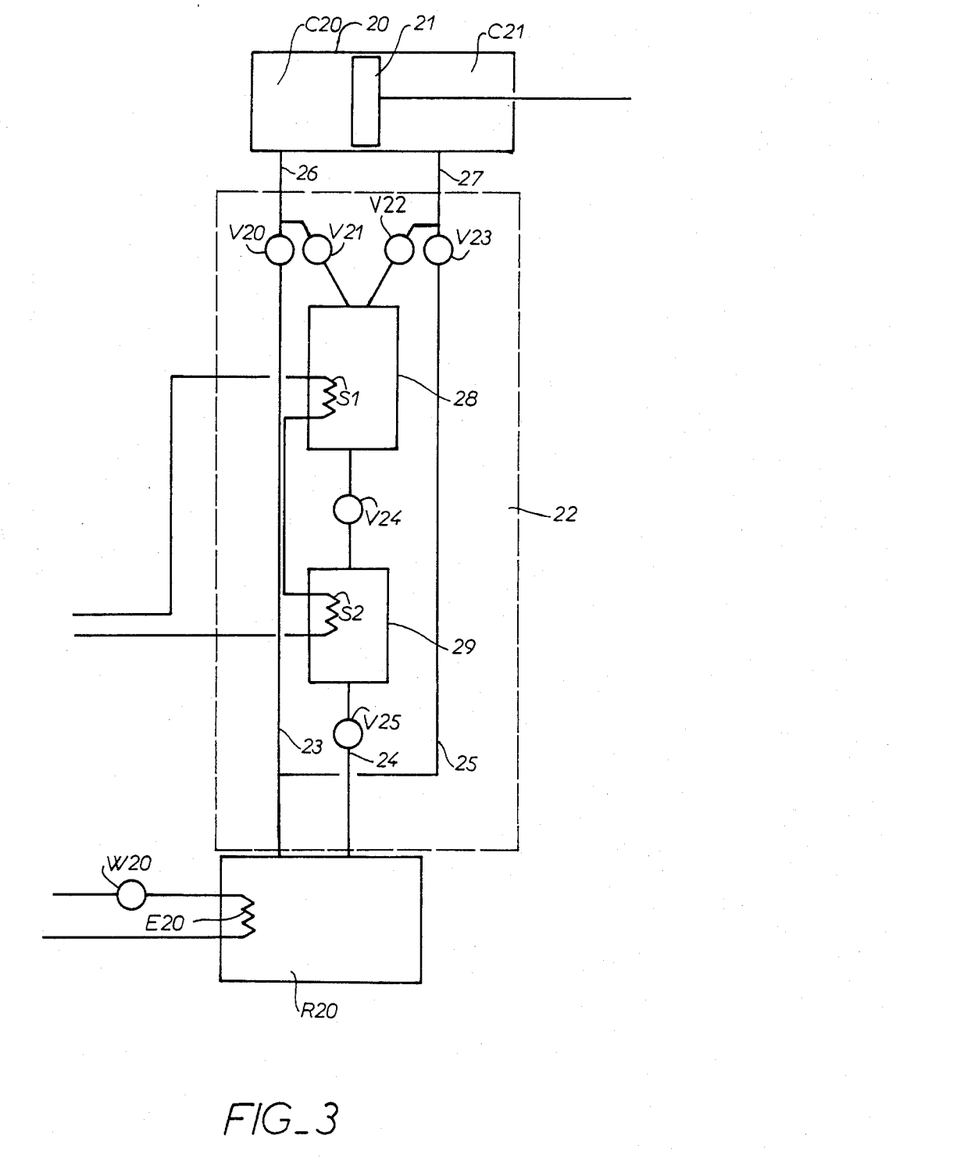
FIG. 3 is a diagram of a second variant upon the invention.

FIG. 3 shows a more complete variant upon the engine of FIG. 2, with a double-acting cylinder. The cylinder 20 which includes a piston 21 is subdivided into two chambers $C_{20}$, $C_{21}$. The engine includes a reservoir $R_{20}$ provided with a heatexchanger $E_{20}$ and the reservoir $R_{20}$ operates solely as an evaporator. The changeover device 22 which connects the chambers $C_{20}$, $C_{21}$ to the reservoir $R_{20}$ through the ducts 23, 24, 25, 26, 27 includes valves $V_{20}$, $V_{21}$, $V_{22}$, $V_{23}$, $V_{24}$, $V_{25}$, a condenser 28 and a lock-chamber 29.

In a first phase of operation, in order to feed the chamber $C_{20}$ with vapour from the reservoir $R_{20}$, the valve $V_{20}$ is open, establishing communication between the ducts 23, 26 and the chamber $C_{20}$. The valve $V_{21}$ is closed. The valve $V_{22}$ is open in order to enable the passing of the vapour contained in the chamber $C_{21}$ towards the condenser 28. The valve $V_{23}$ is closed in order to avoid the vapour passing from the reservoir $R_{20}$ through the ducts 25, 27 into the chamber $C_{21}$. The vapour from the chamber $C_{21}$ thus escapes into the condenser 28 in order to be condensed in it. The condensate is received into the lock-chamber 29, the valve $V_{24}$ being open and the valve $V_{25}$ closed. Then the valve $V_{24}$ is closed and the valve $V_{25}$ opened in order to enable the discharge of the condensate from the lock-chamber 29 into the reservoir $R_{20}$.

The interest of the single-acting variant in accordance with FIG. 2 or double-acting in accordance with FIG. 3 with respect to the embodiment of the schematic diagram as FIG. 1, lies in the continuity of the operation.

In FIGS. 2, 3 the lock-chamber condenser 17 and the lock-chamber 29 and the condenser 28 appear as forming part of the change-over devices 16, 22. In reality it is not so and the valves $V_{10}$, $V_{11}$, $V_{12}$ as well as the valves $V_{20}$, $V_{21}$, $V_{22}$, $V_{23}$, $V_{24}$, $V_{25}$ may be combined into one single changeover device, for example, a slide or a cock which moves or pivots between two positions corresponding respectively with the opening and closing of the various valves in accordance with the state of operation.

Figure 4:
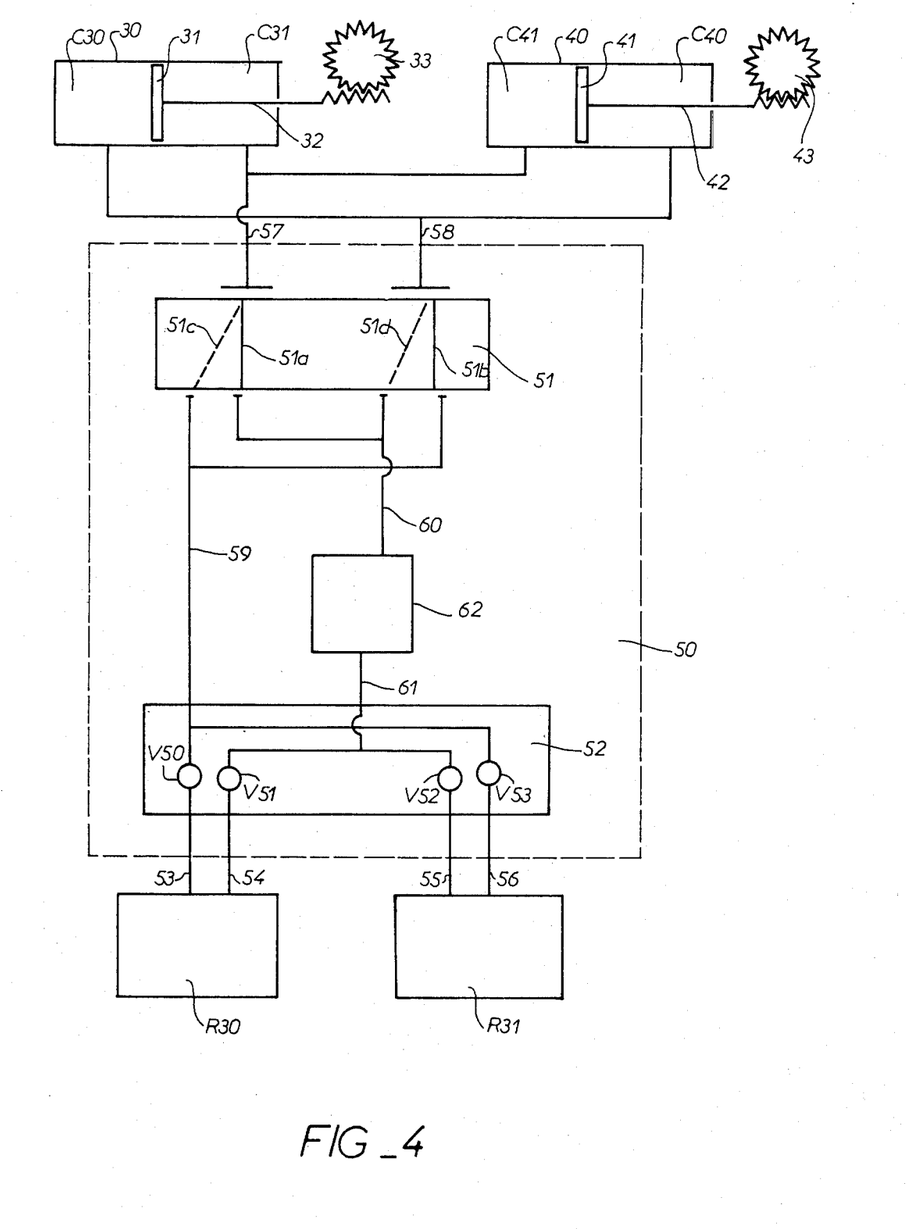
FIG. 4 is a diagram of a third variant.

The engine of FIG. 4 is composed of two cylinders 30, 40 having pistons 31, 41 defining two chambers $C_{30}$, $C_{31}$ and $C_{40}$, $C_{41}$. The rod 32, 42 of each piston operates a connection by rack and pinion 33, 43. The two reservoirs $R_{30}$, $R_{31}$ connected to the two cylinders 30, 40 operate in parallel by way of a changeover device 50 which includes a changeover member 51 cooperating with a second changeover member 52.

The changeover device 50 is connected to the reservoirs $R_{30}$, $R_{31}$ and to the cylinders 30, 40 through the ducts 53, 54, 55, 56, 57, 58, the ducts 57 and 58 being divided into two ducts connected respectively to the chambers $C_{31}$, $C_{41}$. The duct 58 is connected simultaneously to the chambers $C_{30}$, $C_{40}$. The two changeover members 51, 52 are connected through a duct 59 and a double duct 60, 61 with the interposition of a reservoir 62.

At the level of the changeover member 51, the duct 59 is divided into two branches, as well as at the level of the changeover member 52. The same goes for the duct 60 at the level of the changeover device 51 and for the duct 61 at the level of the changeover device 52. The two positions of the changeover member 51 are represented by the solid lines 51a, 51b and the dotted lines 51c, 51d. The changeover member 52 is composed of four valves $V_{50}$, $V_{51}$, $V_{52}$, $V_{53}$.

Figure 5:
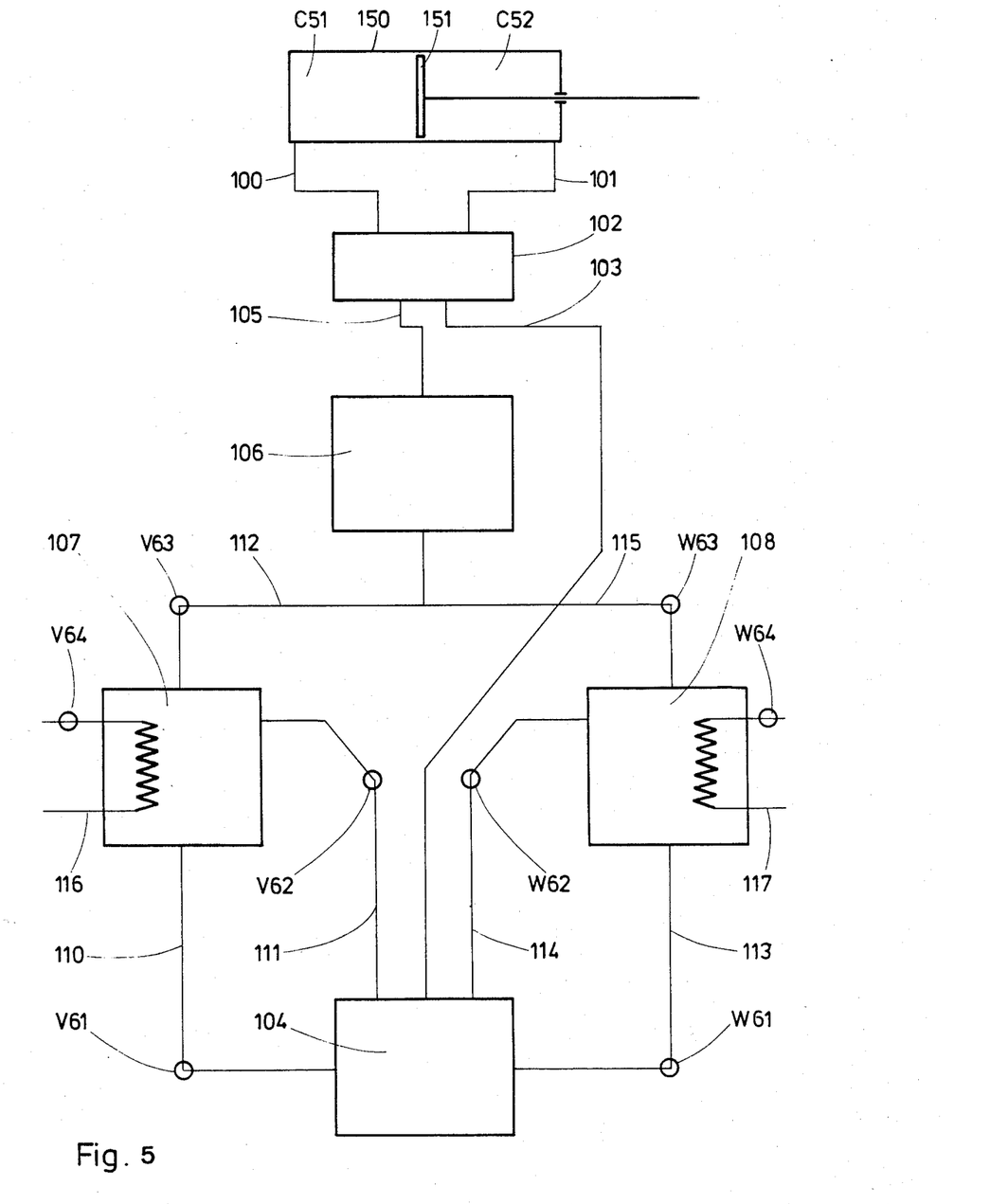
FIG. 5 is an overall diagram of the embodiment of the thermal-conversion engine in accordance with the improvement.

In accordance with FIG. 5 the engine includes a cylinder 150 having a piston 151 closing two chambers $C_{51}$, $C_{52}$ connected respectively by ducts 100, 101 to a control device 102 which ensures alternately the connection of the two chambers $C_{51}$, $C_{52}$ to the evaporator 104 by way of the duct 103 and to the condenser 106 by way of the duct 105.

The circuit includes two auxiliary reservoirs 107, 108. The auxiliary reservoir 107 is connected at the lower portion of it to the evaporator 104 through the duct 110 provided with the valve $V_{61}$; the upper portion of the reservoir 107 is connected to the upper portion of the evaporator 104 through a duct 111 provided with a valve $V_{62}$. The upper portion of the auxiliary reservoir 107 is likewise connected through a duct 112 provided with a valve $V_{63}$ to the condenser 106. The lower portion of the second auxiliary reservoir 108 is connected through a duct 113 provided with a valve $W_{61}$ to the evaporator 104. The upper portion of the auxiliary reservoir 108 is connected through a duct 114 provided with a valve $W_{62}$ to the evaporator 104. Finally the upper portion of the reservoir 108 is connected through a duct 115 provided with a valve $W_{63}$ to the condenser 106.

The first auxiliary reservoir 107 is provided with a cooling fluid circuit 116 including a valve $V_{64}$. Similarly the second auxiliary reservoir 108 is provided with a cooling fluid circuit 117 including a valve $W_{64}$. The filling and the emptying of the chambers $C_{51}$, $C_{52}$ of the cylinder 150 are ensured by the changing over of the changeover device connected to the evaporator and to the condenser. The evaporator 104 and the condenser 106 are alternately taken into combination with the first and the second auxiliary reservoirs 107, 108 as will be described with the aid of FIGS. 6 and 7, so as to remove the problem of residual pressures in the lock-chamber.

Figure 6:
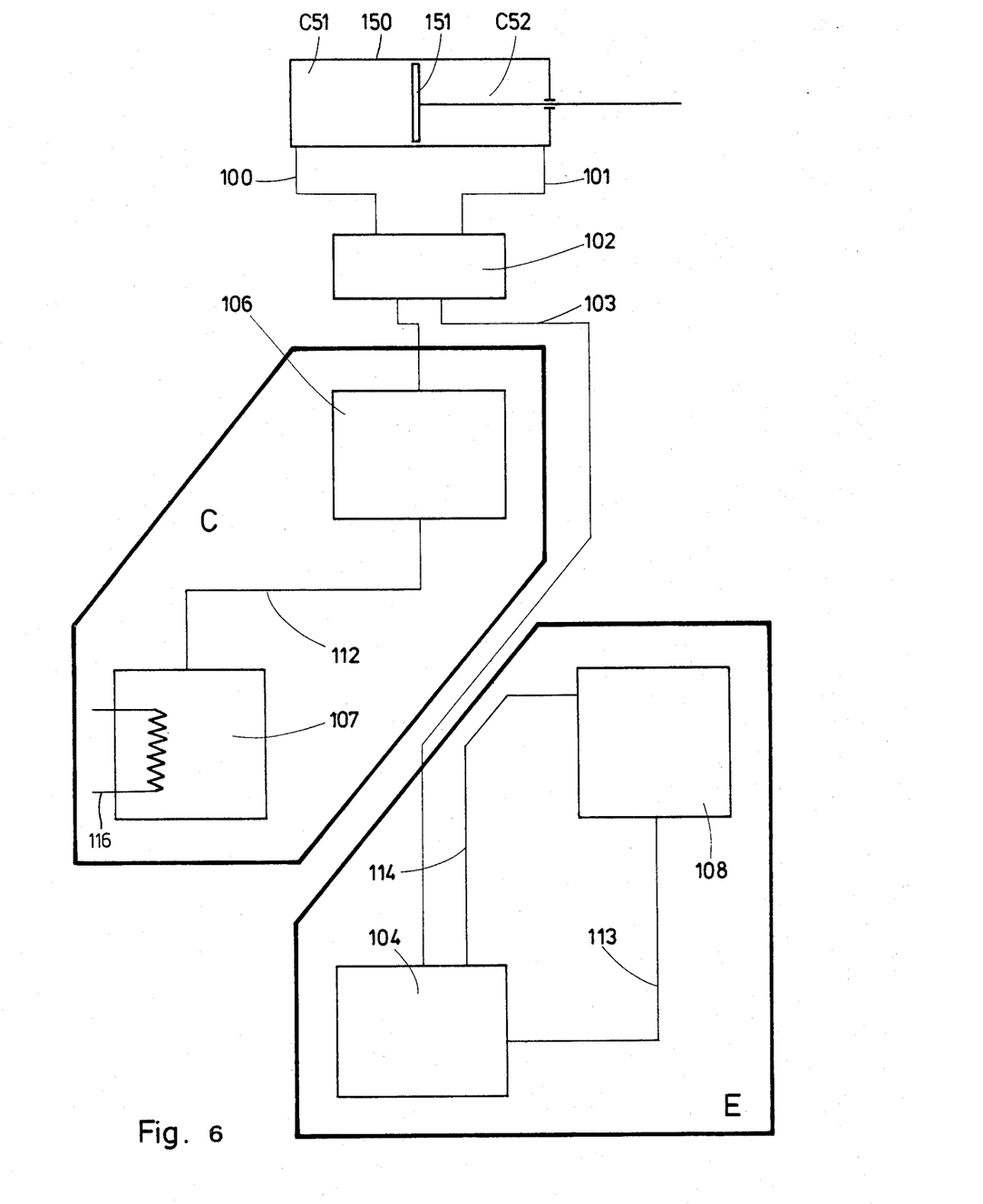
FIG. 6 is a simplified diagram showing the effective portions and their operational connection in a first state of operation of the FIG. 5 embodiment.
Figure 7:
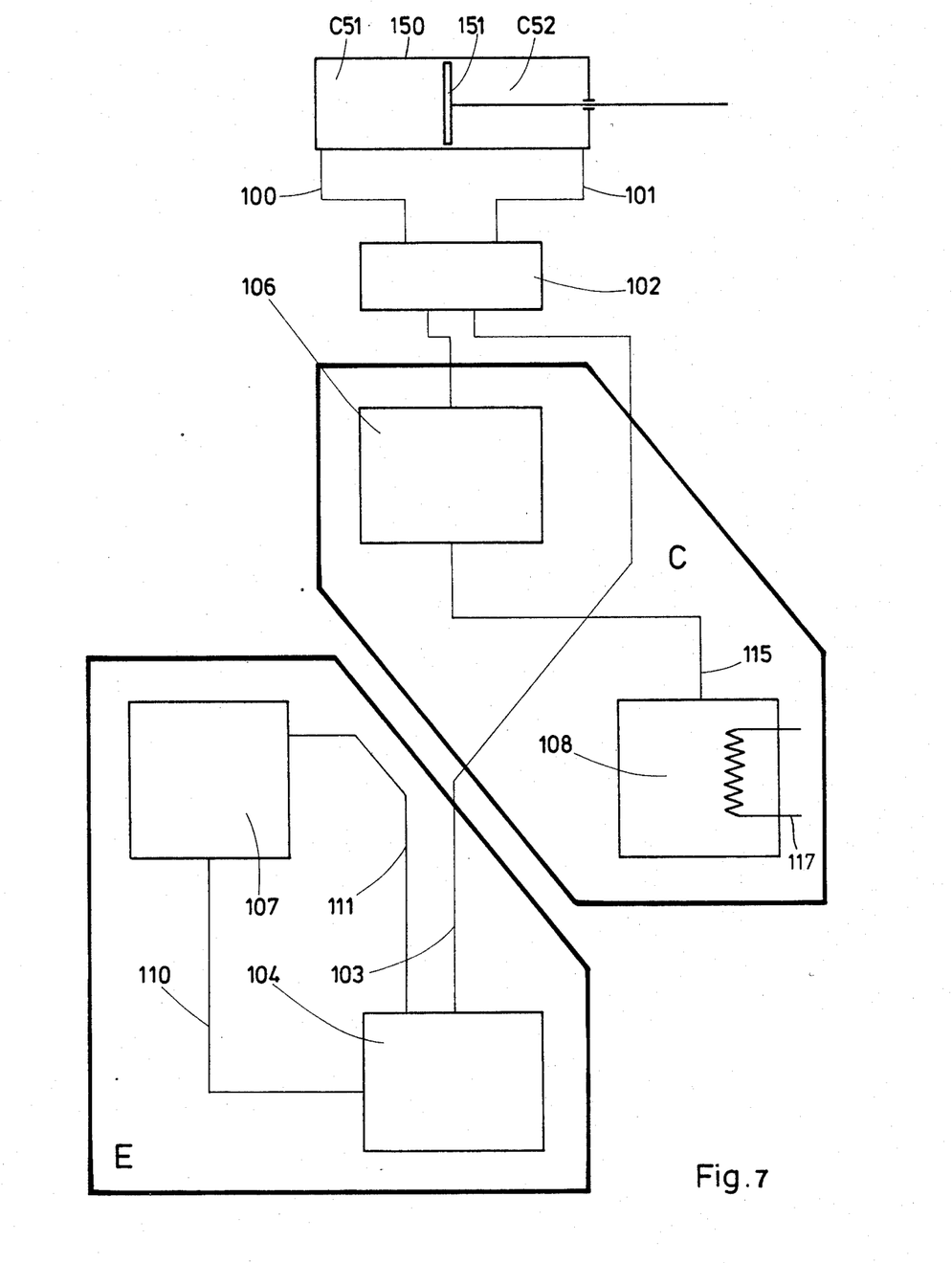
FIG. 7 is a diagram similar to that of FIG. 6 showing the effective parts and their connection in the second state of operation.

In FIGS. 6 and 7, with the aim of simplification, only the connections established between the various reservoirs (evaporator 104, condenser 106, first and second auxiliary reservoirs 107, 108) as well as with the control device 102 are shown. The ducts in which the valves are closed have not been shown. Again, by convention, the valves which are open are not shown.

In accordance with FIG. 6 the evaporator group is formed by the evaporator 104 and the second auxiliary reservoir 108 which are connected by the ducts 113, 114 the valves $W_{61}$, $W_{62}$ in which are open. The condenser group consists of the condenser 106 as well as the first auxiliary reservoir 107 connected through the duct 112, the valve $V_{63}$ in which is open.

The cooling circuit 116 of the second auxiliary reservoir 107 which now forms part of the condenser group is started up, the valve $V_{64}$ being open in order to enable circulation of the cooling fluid. The various other valves, namely, the valves $V_{61}$, $V_{62}$ in the ducts 110, 111 connecting the reservoir 107 to the evaporator 104, are closed as well as the valve $W_{63}$ in the duct 111 which connects the condenser 106 to the second auxiliary reservoir 108. As the second auxiliary reservoir 108 forms part of the evaporator group, the cooling fluid circuit 117 is cut off, its valve $W_{64}$ being closed.

The second state of operation is shown in FIG. 7 with the same conventions as those employed in FIG. 6. The evaporator group E is formed of the evaporator 104 and of the first auxiliary reservoir 107 connected through the ducts 110 and 111 enabling balancing of the pressures and the passing of the liquid contained in the reservoir 107 towards the evaporator 104. The condenser group is formed by the condenser 106 and by the second auxiliary receiver 108 connected to the condenser through the duct 115. As the first auxiliary reservoir 107 forms part of the evaporator, its cooling fluid circuit 116 is not employed and the corresponding valve $V_{64}$ is closed. As the second auxiliary reservoir 108 forms part of the condenser group C its cooling fluid circuit 117 is employed and its valve $V_{64}$ is open.

Furthermore the various circuits or connections which are not shown, their valves being closed, are the following: the valve $V_{63}$ in the duct 112 connecting the condenser 106 to the first auxiliary reservoir 116; the valves $W_{61}$, $W_{62}$ mounted respectively in the ducts 113, 114 connecting the second auxiliary reservoir 108 to the evaporator 104.

The alternation between the two states of operation as FIGS. 6 and 7, that is to say, the opening operation and the closing operation of the valves $V_{61}$, $V_{62}$, $V_{63}$, $V_{64}$ and $W_{61}$, $W_{62}$, $W_{63}$, $W_{64}$ is ensured automatically as soon as the level of condensate in the condenser group C reaches a predetermined value corresponding with a maximum level and as conversely the level of the liquid in the evaporator group E has reached a minimum level. That enables the whole of the circuit of fluid having a relatively low boiling-point to be caused to operate in a closed circuit without encountering problems of residual pressures in the condenser, and thus enables reinjection of condensate without employing any reinjection pump.

The auxiliary reservoirs 107, 108 are located at a level higher than that of the evaporator 104 whilst being located below the condenser 106 in order to enable flow of the condensates by gravity.

Again, the auxiliary reservoirs 107, 108 are connected to the evaporator 104 respectively by two ducts 110, 111 and 113, 114, the first of each pair opening into the bottom of the auxiliary reservoirs 107, 108 and the others 111, 114 into the upper portion of the auxiliary reservoirs 107, 108. These double ducts are necessary in order to enable balancing of the pressures and consequently the discharge of the condensate from the reservoirs 107, 108 by gravity.

I claim:

1. A thermomechanical-conversion engine system comprising a thermomechanical-conversion engine capable of being driven by a low boiling point fluid and a closed circuit for providing low boiling point fluid to and receiving low boiling point fluid from the thermomechanical-conversion engine, said circuit comprising a condenser, an evaporator, a first reservoir, a second reservoir, a line connecting an outlet of the engine to an inlet of said condenser, a line connecting an outlet of said condenser to an inlet of said first reservoir, a line connecting an outlet of said condenser to an inlet of said second reservoir, a line connecting the outlet of said first reservoir to an inlet of said evaporator, a line connecting the outlet of said second reservoir to an inlet of said evaporator, a line connecting an outlet of said evaporator to an inlet of said first reservoir, a line connecting an outlet of said evaporator to an inlet of said second reservoir, a line connecting an outlet of said evaporator to an inlet of the engine, and means for alternating aligning the circuit in one of two alignments, the first alignment enabling flow of low boiling point fluid from said condenser to said first reservoir, prohibiting flow of low boiling point fluid from said condenser to said second reservoir and permitting flow of low boiling point fluid between said evaporator and said second reservoir, the second alignment enabling flow of low boiling point fluid from said condenser to said second reservoir, prohibiting flow of low boiling point fluid from said condenser to said first reservoir and permitting flow of low boiling point fluid between said evaporator and said first reservoir, said first and second reservoirs having means to condense low boiling point fluid.

2. The system in accordance with claim 1 wherein the means for alternately aligning the circuit includes valves in the lines between the condenser and first reservoir, the condenser and second reservoir, the first reservoir outlet and evaporator inlet, the second reservoir outlet and first reservoir inlet, the evaporator outlet and first reservoir inlet, and the evaporator outlet and second reservoir inlet.

3. The system in accordance with claim 1 wherein the first and second reservoirs are at a level higher than the evaporator.

4. The system in accordance with claim 1 including a changeover device in the lines connecting the engine to the inlet of the condenser and outlet of the evaporator.

5. The circuit in accordance with claim 1 whereby the means for alternately aligning the system enables reinjection of condensate from the reservoirs into the evaporator without employing a reinjection pump and without back flow of low boiling point fluid from the evaporator to the condenser.

* * * * *